United States Patent Office 3,646,197
Patented Feb. 29, 1972

3,646,197
NOVEL PROCESS FOR REMOVING COPPER FROM COPPER-CONTAINING BLEOMYCIN
Hamao Umezawa and Yasuhiko Muraoka, Tokyo, and Yuya Nakayama, Yono-shi, Japan, assignors to Zaidan Hojin Biseibutsu Kagaku Kenkyu Kai, Tokyo, Japan
No Drawing. Filed May 14, 1969, Ser. No. 824,666
Claims priority, application Japan, May 21, 1969, 44/33,742
Int. Cl. A61k 21/00
U.S. Cl. 424—177                                             6 Claims

ABSTRACT OF THE DISCLOSURE

A process for removing copper from a solution of copper-containing bleomycin produced from a culture broth of *Streptomyces verticillus*, in which the copper can be completely removed in a short period of time by adding to said solution hydrogen sulfide or a water-soluble sulfide, e.g. an alkali metal sulfide or an alkali metal thiosulfate thereby removing the copper as a copper sulfide, or by adding a boron hydride compound or a hydrosulfite salt thereby removing the copper as cuprous oxide. According to this process, an improved bleomycin having no ill effects on human body can be obtained.

This invention relates to a novel process for removing copper from copper-containing bleomycin.

is theoretically possible but is practically impossible and, therefore, bleomycin treated according to said method cannot be completely freed from copper so that it is high in toxicity and is not sufficient to be used for the therapy of human body. In addition, the said method has such additional drawback that bleomycin itself is liable to be contaminated with the chelating agent employed, and hence cannot be said to be satisfactory.

The object of the present invention is to provide an advantageous process for removing copper from copper-containing bleomycin thereby obtaining purified bleomycin having no ill effects on human body.

With an aim to overcome the above-mentioned drawbacks, the present inventors made various studies on a novel process for removing copper from copper-containing bleomycin. As the result, the inventors have found that when the copper in bleomycin is separated and removed in the form of copper sulfide or cuprous oxide, there are attained such advantages that the removal of copper can be effected more completely and easily than in the conventional process using a chelating agent, and that the resulting bleomycin contains no copper-containing material at all and is extremely lower in toxicity than a copper-free product obtained by use of a chelating agent, so that it is safely usable for the therapy of human body. The present invention has been established on the basis of the above-mentioned finding.

A comparison between the present process and the conventional process using a chelating agent is set forth in Table 1.

TABLE 1.—COMPARISON BETWEEN COPPER REMOVAL PROCESSES

| | No. | Starting material | Process | Time required | Residual Cu (percent) | Easiness of copper removal | Toxicity, $LD_{50}$ (mg./kg.) |
|---|---|---|---|---|---|---|---|
| Present process | 1 | 1,900 mcg. potency/mg., Cu content: 3%, 1 g. | Hydrogen sulfide process (set forth in Example 1 of the present invention). | 15 min | 0.00 | Easy | 312 |
| | 2 | Same as in No. 1 | Ammonium sulfide process (set forth in Example 2 of the present invention). | do | 0.00 | Easy | 312 |
| Conventional process. | 3 | Same as in No. 1 | A solution of 1 g. of copper-containing bleomycin in 100 ml. of 0.1 N HCl was extracted 2 times under shaking, each time using 25 ml. of a chloroform solution of 0.5% dithizone. | 2 hrs | 0.15 | Difficult | 150 |

NOTE.—Toxicity set forth in the table is a $LD_{50}$ value of each copper-free bleomycin as measured by intraperitoneally injecting into mice.

Bleomycin is a water-soluble peptide type antibiotic having anti-tumor and anti-microbial activities which was discovered in 1962 by Umezawa et al., and is produced by subjecting the acctinomycete *Streptomyces verticillus* to aerated culture in a medium containing carbon sources, nitrogen sources and inorganic salts. Purified bleomycin extracted from the culture broth contains copper bonded in the form of chelate and hence has a blue color, and it has been known that as constituents thereof, there exist bleomycins $A_1$, $A_2$, $A_2'$, $A_3$, $A_4$, $A_5$, $A_6$, $B_1$, $B_2$, $B_3$, $B_4$, $B_5$ and $B_6$, which are similar to each other. By chemically removing the copper contained in said bleomycin, there is obtained a white to pale yellow powder of bleomycin freed from copper (hereinafter referred to as "copper-free bleomycin").

As a process for removing copper from copper-containing bleomycin, there has already been known a method using such a chelating agent as dithizone or the like (refer to Japanese patent publication No. 4,279/67). This method is carried out in such a manner that a solution of a chelating agent in chloroform is added to an aqueous acidic solution of copper-containing bleomycin and the mixed solution is shaken in a two liquid layer state to bond the copper in said bleomycin to the chelating agent thereby transferring the copper to the chloroform layer. According to said method, however, a long period of time is required for the removal of copper and extraction should be repeated several times. Further, in accordance with said method, the removal of copper As is clear from the above table, the present process differs from the conventional process using a chelating agent in that in the former, the time required for the copper removal is 15 minutes, whereas in the latter, 2 hours, i.e. 8 times the time required in the former; in the former, the amount of residual copper is none whereas in the latter, about 0.15%; and in the former, the $LD_{50}$ value is 312 mg./kg., whereas in the latter, 150 mg./kg. In view of the above differences, it is understood that the present process is far more excellent than the conventional process.

Concretely, the present invention provides two processes.

The first process is carried out by reacting a solution of copper-containing bleomycin with hydrogen sulfide or a water-soluble sulfide or thiosulfate to precipitate as copper sulfide the copper contained in said bleomycin, separating and removing the copper sulfide by filtration and then recovering copper-free bleomycin from the filtrate.

The second process is carried out by reacting a solution of copper-containing bleomycin with a water-soluble reducing agent to precipitate as cuprous oxide the copper contained in said belomycin, separating and removing the cuprous oxide by filtration and then recovering copper-free bleomycin from the filtrate.

Examples of the water-soluble sulfide employed in the present invention include alkali metal sulfides such as sodium sulfide and potassium sulfide, ammonium sulfide, sulfides of amine type organic compounds such as methylamine, dimethylamine, trimethylamine, ethylamine, diethylamine and triethylamine sulfides, and alkali metal thiosulfates such as sodium thiosulfate and potassium thiosulfate. Examples of the water-soluble reducing agent include boron hydride compounds such as sodium boron hydride and potassium boron hydride, and hydrosulfite salts such as sodium hydrosulfite and potassium hydrosulfite.

The present processes will be explained in further detail below.

In case hydrogen sulfide is used in the first process of the present invention, an excess hydrogen sulfide gas is introduced into a solution of copper-containing bleomycin in methanol, water or a mixture thereof under stirring at room temperature to precipitate copper sulfide, the copper sulfide is separated by filtration and then the filtrate is concentrated to dryness under reduced pressure to obtain desired copper-free bleomycin. Because of its being gaseous, hydrogen sulfide give such advantage that, after completion of the reaction, excess hydrogen sulfide can be completely removed by merely concentrating the reaction liquid under reduced pressure. In case a water-soluble sulfide, e.g. ammonium sulfide, an amine type organic compound such as methylamine sulfide or an alkali metal sulfide such as sodium sulfide, is used, a solution of copper-containing bleomycin may be reacted at room temperature with an aqueous solution of said sulfide in excess of the copper contained in the bleomycin. In the above reaction, there are some cases where ammonium hydroxide or sodium hydroxide is liberated, depending on the reaction conditions, to increase the pH of the reaction liquid. After the reaction, therefore, the filtrate formed by filtering off the copper sulfide is concentrated to dryness either after removing ammonia by concentration under reduced pressure or after adjusting the filtrate to pH 5–7 by direct addition of acid, whereby desired copper-free bleomycin can be obtained. In case a thiosulfate such as sodium thiosulfate is used, a solution of copper-containing bleomycin in water or methanol is acidified by addition of an excess of a reagent to precipitate copper sulfide, and is then treated in the same manner as mentioned above.

Thus, in every case where the reaction reagent is in the form of a gas, a solid powder or a solution, the precipitate of copper sulfide deposited immediately after the reaction is removed by filtration and the filtrate is concentrated to dryness, whereby desired copper-free bleomycin can be easily obtained.

The reducing agent employed in the second process of the present invention includes all of common reducing agents so far as they can convert to monovalent copper ($Cu^+$) the divalent copper ($Cu^{++}$) bonded in the form of chelate to the molecules of bleomycin. The copper in bleomycin can be reduced and removed by reduction using hydrogen in the presence of a catlyst or zinc powder and acid. However, it is difficult to remove the copper without any chemical change of the bleomycin.

The water-soluble reducing agent employed in the present invention, e.g. a boron hydride compound or a hydrosulfite salt, reacts only with copper contained in bleomycin to precipitate cuprous oxide without chemically changing the bleomycin, and hence is successfully usable. The amount of the reaction reagent, based on the amount of copper-containing bleomycin (1900 mcg. potency/mg.), is preferably 10–20% by weight in the case of a boron hydride compound, and is 30–50% by weight in the case of a hydrosulfite salt. In each case, the reaction reagent in the form of a solution or a powder is added to a solution of bleomycin under stirring and is reacted therewith at room temperature for about 20–50 minutes to deposit a precipitate of cuprous oxide, which is then removed by filtration, and the filtrate is acidified to decompose excess reagent, is adjusted to pH 5–7 and is then concentrated to dryness, whereby desired copper-free bleomycin can be obtained. Particularly when sodium boron hydride is used, it is preferable, in consideration of stability of the reagent, that a small amount of sodium bicarbonate or the like is previously added to the starting bleomycin solution to make the pH of the reaction liquid alkaline.

According to the copper removal process using other reaction reagent than hydrogen sulfide, a harmless inorganic salt formed from the reaction reagent migrates into the product bleomycin. If necessary, therefore, the product is preferably desalted according to gel filtration method using Sephadex G–25 (trade name), which is a dextran derivative.

All the copper-free bleomycins obtained according to the above-mentioned processes are same in physicochemical properties and anti-tumor and anti-microbial activities, and when aqueous solutions thereof are charged with a basic copper carbonate or the like copper salt, they give copper-containing bleomycins identical with the starting materials.

The copper-free bleomycins obtained according to the present processes are substantially the same in anti-tumor activity (refer to Table 2) as copper-containing bleomycins and conventional copper-free bleomycins. However, they are markedly lower in toxicity (refer to Table 3) and in such ill effects as blood vessel hindrance at injected portions than copper-containing bleomycins and conventional copper-free bleomycins. For therapeutical purposes, therefore, the copper-free bleomycins of the present invention are far more excellent than copper-containing bleomycins and conventional copper-free bleomycins. This is clear from Tables 2 and 3 shown below.

TABLE 2.—ACTIONS OF BLEOMYCINS ON MOUSE EHRLICH CANCER (ASCITES TYPE)

| Dose (mg./kg./day) | Bleomycin | | | Bleomycin $A_2$ | | | Bleomycin $B_2$ | | |
|---|---|---|---|---|---|---|---|---|---|
| | Copper-free product | | Copper-containing material | Copper-free product | | Copper-containing material | Copper-free product | | Copper-containing material |
| | Present product | Chelated product | | Present product | Chelated product | | Present product | Chelated product | |
| 25.0 | ++ | | Toxic | ++ | Toxic | | ++ | ++ | Toxic. |
| 12.5 | ++ | ++ | do | ++ | ++ | | ++ | ++ | |
| 6.25 | ++ | ++ | ++ | ++ | ++ | Toxic | ++ | ++ | ++ |
| 3.12 | ++ | ++ | ++ | ++ | ++ | ++ | ++ | ± | ++ |
| 1.56 | ++ | ++ | ++ | ++ | ++ | ++ | ++ | − | ++ |
| 0.78 | ++ | ± | ± | ++ | ++ | ++ | ± | − | + |
| 0.39 | ± | − | ± | ++ | − | − | ± | − | − |
| 0.19 | | | | + | | | | | |

NOTE.—Symbols in the table signify the following:
Toxic: Death of mouse was observed by 10 day's continuous intraperitoneal injection of bleomycin.
++ = More than 300% extension of survival period was observed as compared with the control.
+ = 200–300% extension of survival period was observed as compared with the control.
± = Less than 200% extension of survival period was observed as compared with the control.
− = No extension of survival period was observed.

TABLE 3.—ACUTE TOXICITY OF BLEOMYCIN ON MOUSE (INTRAPERITONEAL INJECTION)

[$LD_{50}$ (mg./kg.)]

| Bleomycin | | | Bleomycin $A_2$ | | Bleomycin $B_2$ | |
|---|---|---|---|---|---|---|
| Copper-free product | | Copper-containing material | Copper-free product of the present invention | Copper-containing material | Copper-free product of the present invention | Copper-containing material |
| Present product | Chelated product | | | | | |
| 312 | 150 | 82 | 228 | 49 | 290 | 64 |

The present invention will be concretely illustrated below with reference to examples, which do not limit the scope of the invention.

EXAMPLE 1

78 g. of copper-containing bleomycin (1841 mcg. potency/mg., Cu content: 3.0%) was dissolved in 800 ml. of methanol. Into this solution was introduced hydrogen sulfide gas with stirring for about 10 minutes, whereby couper sulfide precipitated. The copper sulfide was separated by filtration and was washed with methanol. The filtrate and the wash liquid were united together and the mixed liquid was concentrated to dryness under reduced pressure. Thereafter, the residue was dissolved in water and insoluble materials were removed by filtration. The filtrate was again concentrated to dryness under reduced pressure to obtain 60.5 g. of copper-free bleomycin (1981 mcg. potency/mg., Cu content: 0.0%), yield 83.5%, absorbance (aqueous solution) at $$295 \text{ m}\mu \text{ } E_{1 \text{ cm.}}^{1\%} = 78$$

EXAMPLE 2

500 mg. of copper-containing bleomycin (1900 mcg. potency/mg., Cu content: 3.0%) was dissolved in 30 ml. of methanol. To this solution was added drop by drop with stirring an aqueous ammonium sulfide solution until no precipitate of copper sulfide had been formed any more. After separating the precipitate by filtration, the filtrate was concentrated under reduced pressure to volatilize ammonia, was adjusted to pH 6.5 by addition of 4 N-hydrochloric acid and was again concentrated to dryness under reduced pressure to obtain 365 mg. of copper-free bleomycin (1883 mcg. potency/mg., Cu content: 0.0%), yield 72.3%, absorbance (aqueous solution ) at $$295 \text{ m}\mu \text{ } E_{1 \text{ cm.}}^{1\%} = 81$$

EXAMPLE 3

500 mg. of copper-containing bleomycin (1900 mcg. potency/mg., Cu content: 3.0%) was dissolved in 30 ml. of methanol. To this solution was added drop by drop with stirring an aqueous monomethylamine sulfide solution until no precipitate of copper sulfide had been formed any more. After separating the precipitate, the filtrate was concentrated under reduced pressure to volatilize ammonia, was adjusted to pH 6.5 by addition of 4 N-hydrochloric acid and was again concentrated to dryness under reduced pressure to obtain 430 mg. of copper-free bleomycin (1850 mcg. potency/mg., Cu content: 0.0%), yield 83.7%, absorbance (aqueous solution) at $$295 \text{ m}\mu \text{ } E_{1 \text{ cm.}}^{1\%} = 81$$

EXAMPLE 4

500 mg. of copper-containing bleomycin (1900 mcg. potency/mg., Cu content: 3.0%) was dissolved in 30 ml. of methanol. To this solution was added drop by drop with stirring an aqueous sodium sulfide solution until no precipitate of copper sulfide had been formed any more. After separating the precipitate by filtration, the filtrate was adjusted to pH 6 by addition of 4 N-hydrochloric acid and was concentrated to dryness under reduced pressure to obtain 450 mg. of copper-free bleomycin (1740 mcg. potency/mg., Cu content: 0.0%), yield 82.4%, absorbance (aqueous solution) at $$295 \text{ m}\mu \text{ } E_{1 \text{ cm.}}^{1\%} = 80.5$$

EXAMPLE 5

570 mg. of copper-containing bleomycin (1900 mcg. potency/mg., Cu content: 3.0%) was dissolved in 10 ml. of water. In this solution was dissolved 100 mg. of sodium thiosulfate, and the solution was adjusted to pH 3 by dropping therein 4 N-hydrochloric acid. Further, 90 ml. of methanol was added to the solution and a precipitate formed was separated by filtration. The filtrate was adjusted to pH 6.5 by addition of sodium bicarbonate and was then concentrated under reduced pressure to an amount of 5 ml. The concentrated liquid was added to a column packed with 100 ml. of Sephadex G–25 (fine) (trade name) and was eluted with water, and a fraction containing copper-free bleomycin was concentrated to dryness under reduced pressure to obtain 400 mg. of copper-free bleomycin (1760 mcg. potency/mg., Cu content: 0.0%), yield 76.8%, absorbance (aqueous solution) at $$295 \text{ m}\mu \text{ } E_{1 \text{ cm.}}^{1\%} = 80$$

EXAMPLE 6

500 mg. of copper-containing bleomycin (1900 mcg. potency/mg., Cu content: 3.0%) was dissolved in 10 ml. of water. To this solution was gradually added with stirring 100 mg. of sodium boron hydride ($NaBH_4$). Thereafter, 20 ml. of methanol was further added to the solution to deposit a precipitate of cuprous oxide, which was then removed by filtration. The filtrate was adjusted to pH 3.5 by addition of 4 N-hydrochloric acid, thereby decomposing excess reagent, was again adjusted to pH 6.3 and was then concentrated to 5 ml. under reduced pressure. Subsequently, the concentrated liquid was added to a column packed with 100 ml. of Sephadex G–25 (fine) (trade name) and was eluted with water, and a fraction containing copper-free bleomycin was concentrated to dryness under reduced pressure to obtain 410 mg. of copper-free bleomycin (1780 mcg. potency/mg., Cu content: 0.0%), yield 76.8%, absorbance (aqueous solution) at $$295 \text{ m}\mu \text{ } E_{1 \text{ cm.}}^{1\%} = 80$$

EXAMPLE 7

500 mg. of copper-containing bleomycin (1900 mcg. potency/mg., Cu content: 3.0%) was dissolved in 10 ml. of water. To this solution was added with stirring 250 mg. of sodium hydrosulfite ($Na_2S_2O_4$), whereby a precipitate of cuprous oxide immediately deposited. After separating the precipitate by filtration, the filtrate was added to a column packed with 100 ml. of Sephadex G–25 (fine) (trade name) and was eluted with water, and a fraction containing copper-free bleomycin was concentrated to dryness under reduced pressure to obtain 370 mg. of copper-free bleomycin (1700 mcg. potency/mg., Cu content: 0.0%), yield 66.2%, absorbance (aqueous solution) at $$295 \text{ m}\mu \text{ } E_{1 \text{ cm.}}^{1\%} = 80$$

EXAMPLE 8

500 mg. of copper-containing bleomycin (950 mcg. potency/mg., Cu content: 3.9%) was dissolved in 10 ml. of methanol. Into this solution was introduced a hydrogen sulfide gas, with stirring for about 10 minutes, whereby copper sulfide precipitated. The copper sulfide was separated by filtration and was washed with methanol. The filtrate and the wash liquid were united together and the mixed liquid was concentrated to dryness under reduced pressure. Thereafter, the residue was dissolved in water and insolubles were removed by filtration. The filtrate was again concentrated to dryness under reduced pressure to obtain 410 mg. of copper-free bleomycin $A_2$ (938 mcg. potency/mg., Cu content: 0.0%), yield 80.6%, absorbance (aqueous solution) at $$295 \text{ m}\mu \text{ } E_{1\text{ cm.}}^{1\%} = 95$$

EXAMPLE 9

500 mg. of copper-containing bleomycin $B_2$ (3190 mcg. potency/mg., Cu content: 3.5%) was dissolved in 10 ml. of methanol. Into this solution was introduced a hydrogen sulfide gas, with stirring for about 15 minutes, whereby copper sulfide precipitated. The copper sulfide was separated by filtration and was washed with methanol. The filtrate and the wash liquid were united together and the mixed liquid was concentrated to dryness under reduced pressure. Thereafter, the residue was dissolved in water and insolubles were removed by filtration. The filtrate was again concentrated to dryness under reduced pressure to obtain 350 mg. of copper-free bleomycin $B_2$ (3410 mcg. potency/mg., Cu content: 0.0%), yield 74.8%, absorbance (aqueous solution) at $$295 \text{ m}\mu \text{ } E_{1\text{ cm.}}^{1\%} = 102$$

What we claim is:

1. A process for preparing a copper-free bleomycin which comprises reacting in a liquid medium a copper-containing bleomycin with a compound selected from the group consisting of hydrogen sulfide, a water-soluble alkali metal sulfide, ammonium sulfide, a water-soluble lower alkyl amine sulfide, an alkali metal thiosulfate, a water-soluble alkali metal boron hydride, and a water-soluble alkali metal hydrosulfite to precipitate the copper contained in said bleomycin as copper sulfide or cuprous oxide and removing the precipitate from the liquid medium by means of filtration.

2. A process according to claim 1, wherein the water-soluble alkali metal sulfide is selected from the group consisting of sodium sulfide and potassium sulfide.

3. A process according to claim 1, wherein the liquid medium is selected from the group consisting of water, methanol, and mixtures of water and methanol.

4. A process for preparing a copper-free bleomycin which comprises introducing hydrogen sulfide gas into a liquid medium containing a copper-containing bleomycin while stirring to precipitate the copper contained in said bleomycin as copper sulfide, removing the precipitate from the liquid medium by means of filtration and concentrating the filtrate to obtain the copper-free bleomycin.

5. A process for preparing a copper-free bleomycin which comprises reacting in a liquid medium a copper-containing bleomycin with a compound selected from the group consisting of hydrogen sulfide, a water-soluble alkali metal sulfide, ammonium sulfide, a water-soluble lower alkyl amine sulfide and an alkali metal thiosulfate to precipitate the copper contained in said bleomycin as copper sulfide, removing the precipitate from the liquid medium by means of filtration, adjusting the pH of the filtrate to 5 to 7 and concentrating the filtrate to obtain the copper-free bleomycin.

6. A process for preparing a copper-free bleomycin which comprises reacting in a liquid medium a copper-containing bleomycin with a compound selected from the group consisting of a water-soluble alkali metal boron hydride and a water-soluble alkali metal hydrosulfite to precipitate the copper contained in said bleomycin as cuprous oxide, removing the cuprous oxide from the liquid medium by means of filtration, adjusting the pH of the filtrate to 5 to 7 and concentrating the filtrate to obtain the copper-free bleomycin.

References Cited

Umezawa et al.: The Journal of Antibiotics, vol. XIX (1966), pages 200 and 206.

Merck Index: vol. 7th edit. (1960), pages 302 and 303.

SAM ROSEN, Primary Examiner

U.S. Cl. X.R.

260—112

UNITED STATES PATENT OFFICE
CERTIFICATE OF CORRECTION

Patent No. 3,646,197     Dated February 29, 1972

Inventor(s) Umezawa, et al

It is certified that error appears in the above-identified patent and that said Letters Patent are hereby corrected as shown below:

The priority data should read:

"application Japan, May 21, 1968, 43/33742" instead of "application Japan, May 21, 1969, 44/33742".

Signed and sealed this 26th day of December 1972.

(SEAL)
Attest:

EDWARD M. FLETCHER, JR.
Attesting Officer

ROBERT GOTTSCHALK
Commissioner of Patents